United States Patent [19]

Boots

[11] Patent Number: 4,673,210
[45] Date of Patent: Jun. 16, 1987

[54] OPEN ROOF CONSTRUCTION FOR A VEHICLE

[75] Inventor: Robert T. Boots, Haarlem, Netherlands

[73] Assignee: Vermeulen-Hollandia Octrooien II B.V., Netherlands

[21] Appl. No.: 774,458

[22] Filed: Sep. 10, 1985

[51] Int. Cl.$^4$ ............................ B60J 7/05; B60J 7/053
[52] U.S. Cl. ..................................... 296/221; 296/216; 296/223
[58] Field of Search ......................... 296/216, 221-223

[56] References Cited

U.S. PATENT DOCUMENTS 4,364,601 12/1982 Katayama et al. .................. 296/221
4,403,805 9/1983 Strem, Jr. et al. .................. 296/221
4,407,541 10/1983 Boots .................................. 296/221

FOREIGN PATENT DOCUMENTS 2090630 7/1982 United Kingdom .
2133750 8/1984 United Kingdom ................ 296/222

Primary Examiner—Randolph A. Reese
Assistant Examiner—Dennis H. Pedder
Attorney, Agent, or Firm—Kinney & Lange

[57] ABSTRACT

A closing panel for a roof opening in a vehicle is operated by a slide member moving relative to a stationary track and when the panel is in a forwardly position, a movable support bracket is permitted to move to guide the front of the panel to move between a closed position and a lowered position. When the panel is to be tilted to a ventilation position, the movable bracket is permitted to move forwardly to raise the front edge of the panel slightly to compensate for location of the pivoting point relative to the front edge of the panel. When the panel is moved rearwardly while in its lowered position, a pin on the movable bracket operates in crossing slots between a stationary track and a slidable displacing element to lock the panel against tilting movement. When the panel is in its most forwardly position, the crossing slots permit the tilting movement.

13 Claims, 4 Drawing Figures

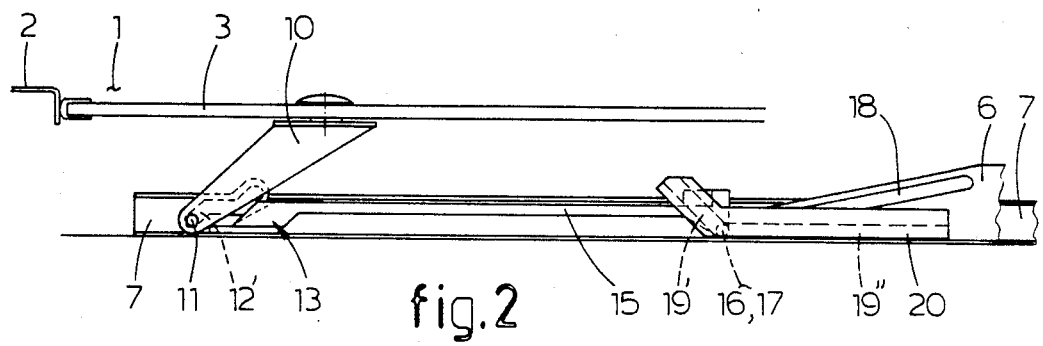
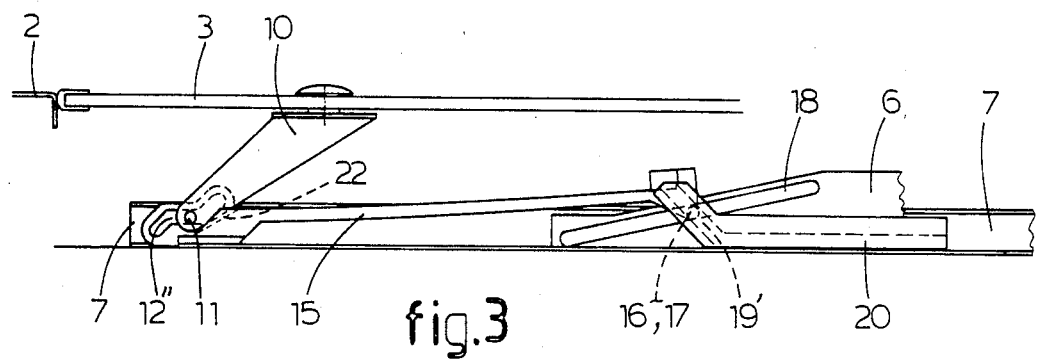
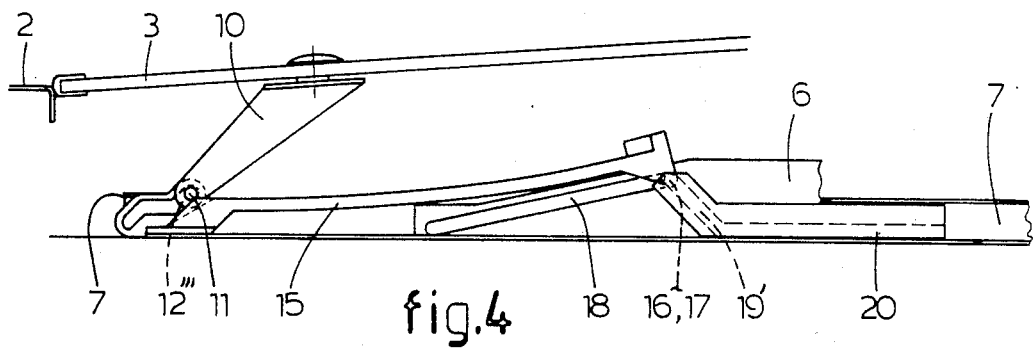

OPEN ROOF CONSTRUCTION FOR A VEHICLE

The invention relates to an open roof construction with a roof opening, comprising a panel which closes the roof opening in its closed position and which is movable from this closed position to an opened position, and back, while for displacing the panel a push-pull means on at least one side engages a slidable element, which is guided in a substantially horizontal rail of a stationary guide, the panel engaging a support means near its front side, which support means adjusts the height of the front side of the panel when the panel is moved from its closed position.

In a known embodiment of such an open roof construction the panel is supported at its front side by the slidable element which extends far forwardly.

However, this known open roof construction has the disadvantage that the slidable element occupies a lot of space at the front side of the open roof construction if the slidable element produces a great forward displacement.

It is an object of the present invention to provide an open roof construction, in which the above mentioned disadvantage is removed in an efficient way.

For this purpose the open roof construction according to the invention is characterized in that the support means is in engagement with the slidable element as well as with the stationary guide in such manner that when the slidable element is being displaced in the foremost position of the panel the support means moves with respect to the slidable element as well as with respect to the stationary guide.

In this way the slidable element adjusts the support means, wherein a displacement of the slidable element results in a smaller displacement of the support means, so that it requires less space at the front side of the open roof construction.

The invention will hereafter be elucidated with reference to the drawings, which show an embodiment of the open roof construction according to the invention by way of example.

FIG. 2 is a schematic side view of the portion of the open roof construction of FIG. 1 in the downwardly moved position of the panel.

FIG. 3 is a schematic side view corresponding with FIG. 2, wherein, however, the panel is shown in its closed position.

FIG. 4 is a schematic side view corresponding with FIG. 2 and 3, and shows the panel in its ventilation position.

Figure 1:
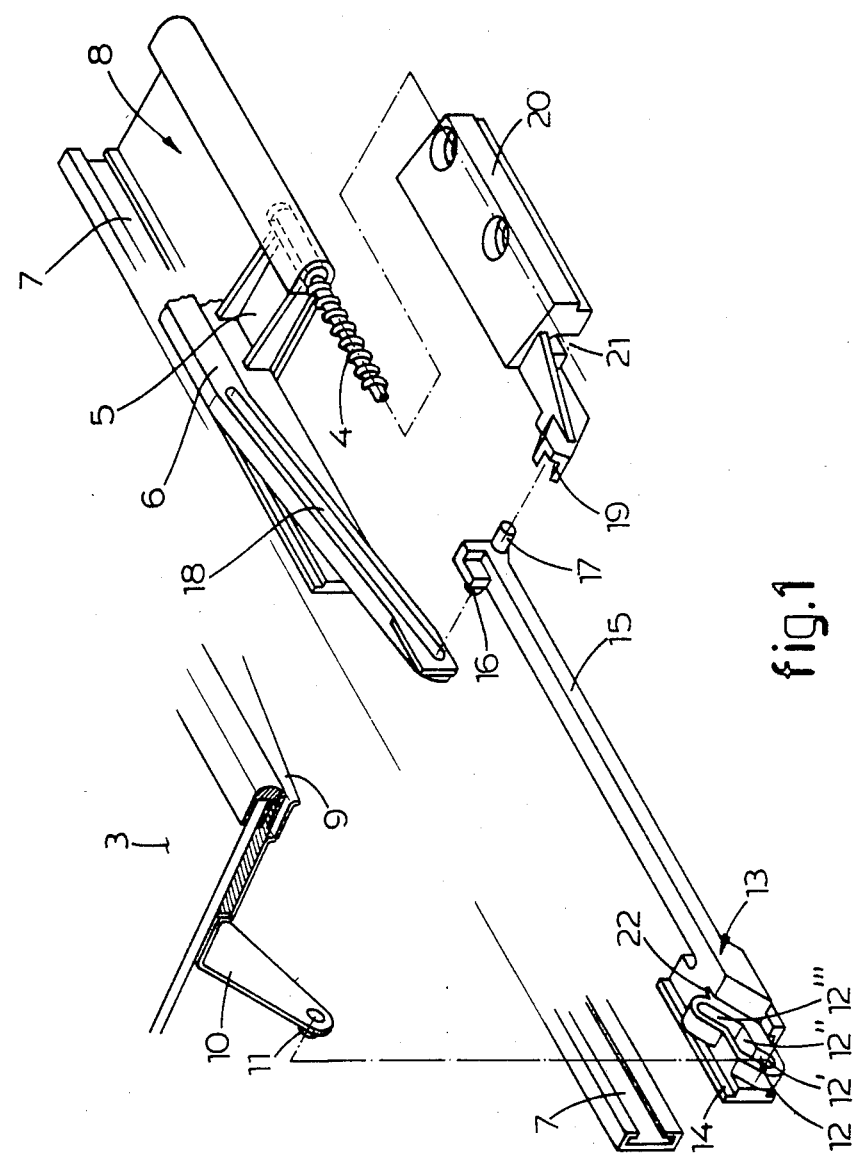
FIG. 1 is a schematic, perspective view of a portion of an embodiment of the open roof construction according to the invention, wherein several parts are shown separately from each other.

The drawings show by way of example an embodiment of an open roof construction for a vehicle, which is provided with an opening 1 in the fixed roof 2.

This open roof construction comprises a panel 3, which can be moved from its closed position in the roof opening (FIG. 3) into a downwardly moved position (FIG. 2), in which the panel can be slid backwardly under the fixed roof 2 to a wholly or partly open position and can be moved forwardly again to the closed position.

The panel 3 can further be moved from its closed position to a backwardly and upwardly inclined ventilation position (FIG. 4) and from this position may be moved back again to the closed position.

For displacing the panel 3 a cable-like push-pull means 4 has been provided at least at one side but in general at either side of the open roof construction, which push-pull means 4 can be displaced by an actuating member (not illustrated) in the longitudinal direction of the vehicle and engages a bracket 5 on a slide plate 6 that is guided in a substantially horizontally rail 7 which forms a part of a stationary guide 8.

In general at either side of the vehicle such stationary guide 8 has been arranged, each guide guiding a slide plate 6 disposed at the respective side of the vehicle, while each slide plate can be moved by its own cable-like push-pull means 4 in its stationary guide 8 and both push-pull means can be commonly displaced.

In the embodiment represented in the drawings always only one slide plate 6 and the stationary guide 8 disposed at one side of the vehicle as well as the elements co-operating therewith and hereinafter further described have been shown it being understood that in general at the other side of the vehicle similar elements have been used which constitute the mirror image of the elements represented in the drawings.

At a distance behind the front side of the panel 3 the panel 3 and the slide plate 6 are connected with each other by means of a connection means known per se, for instance the applicant s co-pending U.S. patent application, Ser. No. 774,457, filed Sept. 10, 1985, which is incorporated by reference.

At the lower side of the panel 3 a section 9 is mounted which is provided with a bracket 10 near the front side of the panel 3. The lower free end of this bracket 10 carries a transverse pivot pin 11, which pivotably and slidably engages a closed guide slot 12 of a support means 13.

The guide slot 12 has a stepped configuration and includes a backwardly and upwardly inclined front portion 12', a substantially horizontal part 12" joining the front side thereof, and a backwardly and upwardly inclined rear portion 12''' joining the rear side of the horizontal part.

In the position of the panel 3 between the closed position and the ventilation position the bracket 10 is guided near its lower side in a groove 22 in the support means 13, whereby in these positions the pivot pin 11 on the bracket 10 is additionally locked in the transverse direction.

A guide section 14 formed on the support means 13 is guided in the horizontal rail 7 of the statinary guide 8 just like the slide plate 6.

The support means 13 has a flexible arm 15 extending in the backward direction, the flexible arm 15 carrying near its rear side two substantially horizontal transverse pins 16, 17 respectively, which are aligned with each other but extend in opposite directions.

The transverse pin 16 slidably and pivotably engages a backwardly and upwardly inclined slot 18, which is formed in the front portion of the slide plate 6.

The opposite transverse pin 17 co-operates with a slot 19 in a guide block 20 fixed to the stationary guide 8.

The slot 19 includes a forwardly and upwardly inclined front portion 19' and a substantially horizontal portion 19" joining the rear side thereof, the rear end of the horizontal portion 19" being open.

The guide block 20 is provided with a passage 21 for passing the cable-like push-pull means 4 therethrough.

FIG. 2 illustrates the downwardly moved position of the panel 3, in which position a panel 3 can be slid backwardly under the fixed roof 2 to a wholly or partly opened position and may be moved back again to the closed position.

When the panel is moved with the panel 3 near its foremost position the transverse pin 17 passes through the substantially horizontal portion 19" of the slot 19 in the guide block 20 of the stationary guide 8. The transverse pin 17 can enter or leave the slot 19 through the open rear end of the slot portion 19".

In the foremost position of the panel 3 according to FIG. 2 the transverse pin 17 is at the transition of the substantially horizontal slot portion 19" and the forwardly and upwardly inclined slot portion 19'.

The transverse pin 16, which is in alignment with the transverse pin 17 is then situated at the foremost end of the backwardly and upwardly inclined slot 18. In case the transverse pin 17 is in the substantially horizontal slot portion 19" the transverse pin 17 and thereby the support means 13 is locked with respect to the slide plate 6 in consequence of the relative courses of the slots 18 and 19", when the slide plate 6 is displaced said displacement being after all parallel to the slot portion 19".

In the position of FIG. 2 the pivot pin 11 on the bracket 10 of the panel 3 is in engagement with the front side of the backwardly and upwardly inclined front portion 12' of the guide slot 12. The front side of the panel 3 is then in its lower position.

In FIG. 3 the panel 3 is shown in the closed position, wherein the slide plate 6 is forwardly moved from the position of FIG. 2 by means of the cable-like push-pull means 4. It is obvious that this displacement is comparatively big.

Furthermore it can be seen that the positions of the transverse pins 16, 17 respectively of the support means 13 are changed with respect to the slots 18, 19 respectively.

These positions are determined by the relative positions of the slots 18, 19 with respect to each other. When the slide plate is moved forward from the position of FIG. 2 the transverse pin 17 cannot be moved further forwardly, because the slot portion 19' extends upwardly. As a cause of the relative movement of the slot 18 with respect to the crossing slot portion 19' the transverse pin 16 can move backwardly and upwardly in the slot 18, while the transverse pin 17 slides forwardly and upwardly in the slot portion 19'. The transverse pins 16, 17 are therefore always situated at the cross point of the slots 18, 19.

During said forward movement of the slide plate 6 from the position of FIG. 2 the support means 13 is moved with respect to the stationary guide 8 along a small distance, corresponding with the horizontal component of the displacement of the transverse pin 17 in the slot portion 19'. As a cause thereof the pivot pin 11 passes through the backwardly and upwardly inclined guide slot portion 12', so that the front side of the panel 3 moves upwardly.

In the position of FIG. 3 the pivot pin 11 has reached the substantially horizontal guide slot portion 12", whereby a horizontal free movement of the support means 13 is possible without a change in the position of the panel 3.

FIG. 4 shows the panel 3 in its maximum backwardly and upwardly inclined ventilation position, wherein the slide plate 6 has reached its foremost position. In this position the transverse pin 16 on the support means 13 is in engagement with the rearmost end of the slot 18, while the transverse pin 17 is situated in its foremost position in the slot portion 19'.

The pivot pin 11 on the bracket 10 of the panel 3 has completely passed through the portion 12''' of the guide slot 12 and has reached its upper position. The upward displacement of the pivot pin 11 compensates the downward pivot movement of the portion of the panel 3 extending in front of the bracket 10, which pivot movement appears when the panel 3 is brought to its ventilation position. Hereby the foremost end of the panel 3 remains substantially in the same height as the fixed roof 2, so that the air-stream is not disturbed when the vehicle is driven.

The invention is not restricted to the embodiment shown in the drawings by way of example, which can be varied in different ways within the scope of the invention.

I claim:

1. An open roof construction for a vehicle with a roof opening, said vehicle having a longitudinal direction, comprising a panel having a forward edge and having at least a first closed position closing the roof opening, the panel being movable from the closed position to a second open tilted position and back to the first closed position;

said panel being movable between said first and second positions while the forward edge of the panel remains substantially in a foremost position adjacent a front of the opening;

a stationary guide with a substantially horizontal rail extending in a longitudinal direction of the vehicle;

a slidable element for displacing the panel, the slidable element being driven by a push-pull means and being guided in the substantially horizontal rail of the stationary guide; and support means for supporting a front side of the panel and being adapted to adjust the height of the forward edge of the panel when the panel is moved from and to its first closed position, the support means being slidably guided in the substantially horizontal rail of the stationary guide and being engaged within both the slidable element and the stationary guide in such manner that when the slidable element is displaced along the horizontal rail while the panel is in the foremost position the support means moves longitudinally along the horizontal rail and relatively with respect to both the slidable element and the stationary guide.

2. An open roof construction as claimed in claim 1, wherein the support means is slidably guided in the substantially horizontal rail of the stationary guide.

3. An open roof construction as claimed in claim 1, wherein the panel carries a bracket near its front side, the bracket being supported on the support means, and wherein the support means is provided with a groove, in which the lower side of the bracket is guided.

4. An open roof construction for a vehicle having a front and a rear, with a roof opening, comprising a panel having a front side and which closes the roof opening in a closed position with the panel in a foremost location, and which panel is movable from this closed position to an open tilted position and back to its closed position;

a slidable element;

push-pull means on at least one side of the panel engaging the slidable element;

a stationary guide adjacent the roof opening and having a substantially horizontal rail, said slidable element being guided in said substantially horizontal rail; and support means positioned near the front side of the panel for adjusting the height of the front side of the panel when the panel is moved from its closed position, said support means including means engageable with the sliding element through a pin and a first slot connection, and means engageable with the stationary guide through a pin and second slot connection, the first and second slots defining paths that cross each other so that when the slidable element is being moved with the panel in its foremost position, the support means moves with respect to the slidable element as well as with respect to the stationary guide.

5. An open roof construction for a vehicle with a roof opening comprising a panel having a front side, and which panel closes the roof opening in a closed position with the panel in a foremost location relative to the opening, said panel being movable from its closed position to an open position and back;

a slidable element;

a stationary guide adjacent the roof opening and having a substantially horizontal rail, said slidable element being guided in said substantially horizontal rail;

means on at least one side of the panel to engage and move the slidable element along said horizontal rail;

support means positioned near the front side of the panel for adjusting the height of the front side of the panel when the panel is moved from its closed position to its open position, the support means including a first pin extending in a first direction, said slidable element having a first slot therein for receiving said first pin and the support means having a second pin extending in an opposite direction from said first pin; and a second slot provided in said stationary guide, said first and second slots having paths that intersect, so that when the slidable element is displaced with the panel in its foremost location, the support means moves with respect to the slidable element as well as with respect to the stationary guide, and in at least one position of said support means the support means is locked to move with said slidable element along said substantially horizontal rail.

6. An open roof construction as claimed in claim 5, wherein the first and the second transverse pin are in alignment with each other.

7. An open roof construction as claimed in claim 6, wherein support means includes an arm extending rearwardly from the front of the panel, and the first transverse pin and the second transverse pin are mounted near the rear end of said arm.

8. An open roof construction as claimed in claim 5, wherein the first slot in the slidable element inclines backwardly and upwardly, while at least a portion of the second slot in the stationary guide inclines forwardly and upwardly.

9. An open roof construction as claimed in claim 8, wherein the front side of the panel is movable from the closed position to a downward position, as the slidable element moves rearwardly with the panel in its foremost location, the second slot comprising a substantially horizontal portion, which joins the rear end of the forwardly and upwardly inclined portion of the second slot, the inclined portion of the first slot and the horizontal portion of the second slot preventing relative movement between the slidable element and the support means when the slidable element is moved rearwardly a premeasured amount from the downward position.

10. An open roof construction as claimed in claim 9, wherein the panel is provided with a pivot pin near its front side, said support means having a guide slot, the pivot pin engaging the guide slot in the support means.

11. An open roof construction as claimed in claim 10, wherein the panel can be moved from the closed position to a rearwardly and upwardly inclined ventilation position, and back, and wherein the guide slot in the support means includes a backwardly and upwardly inclined front portion, a substantially horizontal portion joining the rear end thereof and a backwardly and upwardly inclined portion, joining the rear end of the horizontal portion.

12. An open roof construction as claimed in claim 5, wherein the second slot is formed in a guide block of the stationary guide.

13. An open roof construction as claimed in claim 5, wherein the slidable element consists of a slide plate, and wherein the first slot is formed in the front portion of the slide plate.

* * * * *